Nov. 27, 1923.    1,475,894
C. W. STARKER
BEARING HOUSING FOR ELECTRIC MOTORS
Filed Oct. 13, 1917    2 Sheets-Sheet 2

WITNESSES:
T. R. Krear
F. A. Lind

INVENTOR
Charles W. Starker
BY
Wesley G. Carr
ATTORNEY

Patented Nov. 27, 1923.

1,475,894

UNITED STATES PATENT OFFICE.

CHARLES W. STARKER, OF PITTSBURGH, PENNSYLVANIA, ASSIGNOR TO WESTINGHOUSE ELECTRIC & MANUFACTURING COMPANY, A CORPORATION OF PENNSYLVANIA.

BEARING HOUSING FOR ELECTRIC MOTORS.

Application filed October 13, 1917. Serial No. 196,393.

*To all whom it may concern:*

Be it known that I, CHARLES W. STARKER, a citizen of the United States, and a resident of Pittsburgh, in the county of Allegheny and State of Pennsylvania, have invented a new and useful Improvement in Bearing Housings for Electric Motors, of which the following is a specification.

My invention relates to dynamo-electric machines and particularly to electric motors provided with ball or roller bearings and reduction gearing associated with the armature shafts thereof.

The object of my invention is to provide a bearing housing for motors that may be readily formed from a single piece of sheet metal and therefore, be particularly simple and inexpensive in construction.

A further object of my invention is to provide a bearing-housing of the above-indicated type so formed that it provides a supporting arm for the gear-case that is usually employed to enclose the reduction gearing employed in connection with electric motors, particularly of the railway type.

Figure 1:
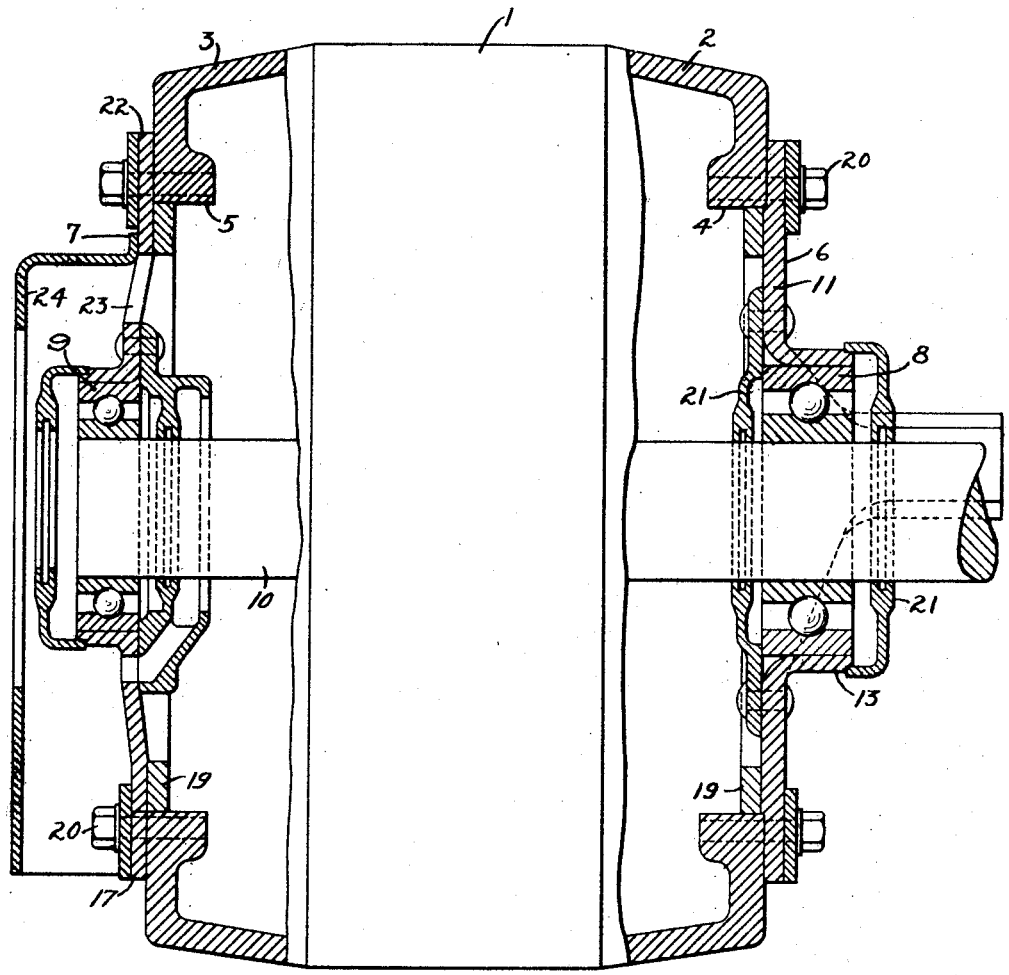
Figures 2, 3:
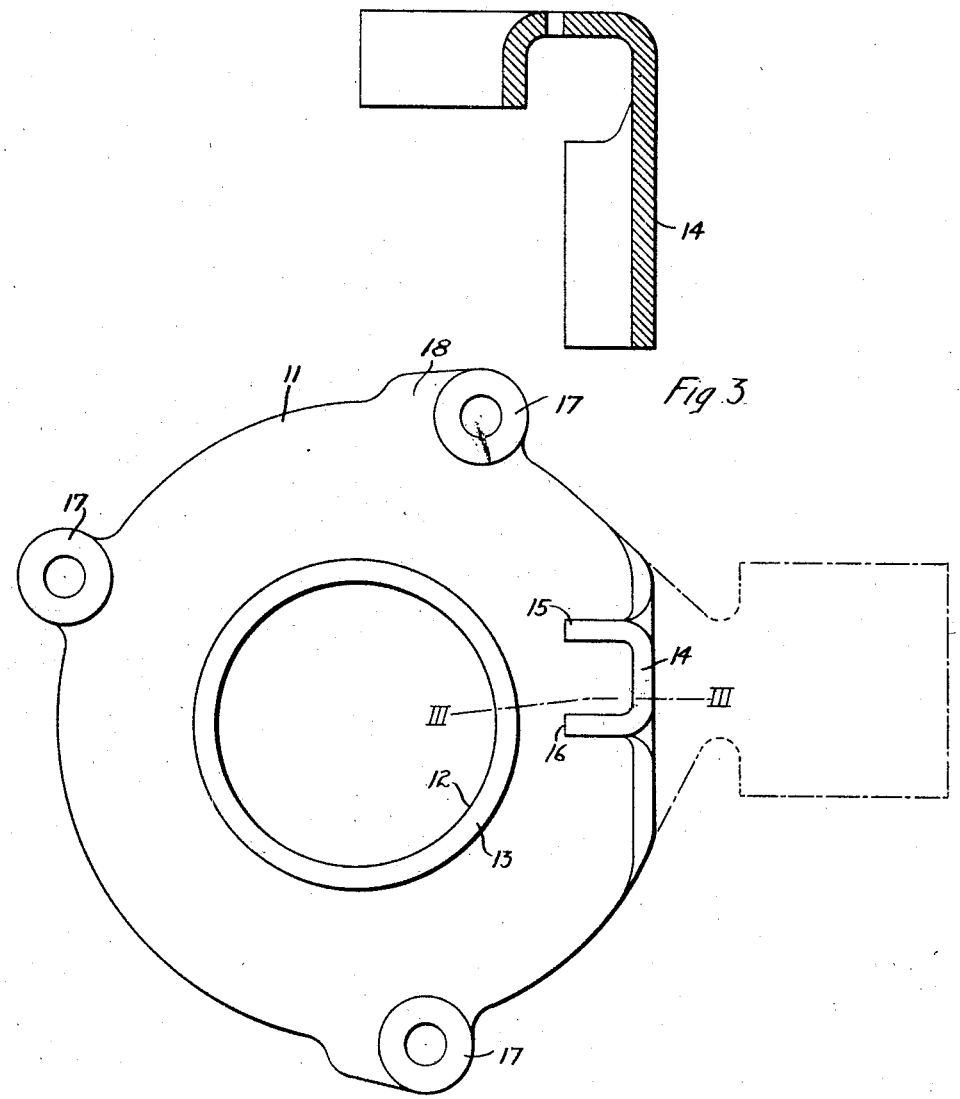

In the accompanying drawings, Fig. 1 is a view, partially in section and partially in side elevation, of an electric motor provided with bearing-housings embodying my invention. Fig. 2 is an end view of one of the bearing-housings shown in Fig. 1, removed from the motor, and Fig. 3 is a fragmentary sectional view along the line III—III of Fig. 2.

Referring to Fig. 1, the motor comprises a casing or frame 1 having end portions 2 and 3 that are respectively provided with centrally located circular openings 4 and 5. Bearing-housings, indicated as a whole at 6 and 7, are secured adjacent to the openings 4 and 5 respectively, and support ball bearings 8 and 9 within which an armature shaft 10 is rotatably mounted.

Referring now to Figs. 2 and 3, the bearing-housing 6 comprises an approximately circular plate 11, having a centrally located opening 12 that is surrounded by an annular flange 13. The plate 11 is further provided, at one side, with a laterally extending portion 14 that is preferably formed by bending a projecting portion of the plate 11 into parallel relation with the longitudinal axis of the opening 12, the original form of the projecting portion 14 being shown in dash and dot lines. The bent portion 14 is provided with wing portions 15 and 16 that are bent into parallel relation with each other to form a suitable seat for the end portion of a gear-case member (not shown). The plate 11 is further provided with a plurality of circular disks 17 that are welded or otherwise suitably secured to peripheral projections 18 of the plate. A ring 19 is secured to the opposite side of the plate 11 from the disks 17, by welding or other suitable means, the outer diameter of the ring 19 being substantially the same as the diameter of the opening 4, in order to purposely aline the bearing-housing with respect to the opening 4. The plate 11 is secured to the end portion 2 by means of bolts 20 extending through the disks 17 and the projections 18, the function of the disks 17 being to re-inforce the plate 11 at the points where it is supported. A ball or roller bearing 8 is located within the opening 12 of the plate 11, and is supported by the flange 13. Suitable annular oil-guards 21 are secured to the plate 11 in order to prevent creepage of oil from the bearing 8 along the shaft 10.

The bearing-housing 7, is formed in substantially the same manner as the housing 6 with the exception that the plate 22 is not provided with a gear-casing supporting arm. The plate 22 is provided with a plurality of ventilating openings 23, through which air currents may be drawn into the interior of the casing 1. A shield or baffle member 24 aids in preventing foreign matter contained in the air from entering the air inlets.

While I have shown my invention in a simple and preferred form, it is not so limited but is susceptible of various modifications within the scope of the appended claims.

I claim as my invention:

1. An end plate for a dynamo-electric machine comprising a body portion, an arm formed integrally with the edge of the body portion and extending in a direction transverse to the plane thereof and a plurality of ear portions formed integrally with said arm and extending in dirrections transverse to the plane of the arm to form means for securing said arm to a supporting structure.

2. An end plate for a dynamo-electric machine comprising a substantially discoidal body portion, a relatively flat arm formed integrally with the edge of said plate and extending in a direction normal to the plane thereof, and a plurality of substantially parallel supporting ears formed integrally with the edge of said arm adjacent to the extremity thereof and disposed in planes normal to the plane of the arm.

3. An end plate for a dynamo-electric machine comprising a body portion having a flanged aperture therein adapted to form a bearing housing, and an arm formed integrally with the outer edge of said body portion and extending in a direction transverse to the plane of the body portion, said arm being provided with a plurality of spaced and parallel ear portions adapted to be secured to a supporting structure.

In testimony whereof, I have hereunto subscribed my name this 26th day of Sept., 1917.

CHARLES W. STARKER.